(12) United States Patent
Namakian et al.

(10) Patent No.: US 8,083,167 B1
(45) Date of Patent: Dec. 27, 2011

(54) PORTABLE LEAF GRINDING DEVICE

(76) Inventors: Nojan Namakian, Encino, CA (US); Taylor C. Ervin, Encino, CA (US)

( * ) Notice: Subject to any disclaimer, the term of this patent is extended or adjusted under 35 U.S.C. 154(b) by 70 days.

(21) Appl. No.: 12/799,339

(22) Filed: Apr. 23, 2010

(51) Int. Cl.
  *A47J 42/04* (2006.01)
(52) U.S. Cl. .................................................. 241/169.1
(58) Field of Classification Search ................ 241/168, 241/169.1
  See application file for complete search history.

(56) References Cited

U.S. PATENT DOCUMENTS

| | | |
|---|---|---|
| 197,982 A | 12/1877 | Seifert et al. |
| 210,837 A | 12/1878 | Chalas |
| 2,479,151 A | 8/1949 | Bostick |
| 2,688,448 A | 9/1954 | Lenz |
| 2,763,440 A | 9/1956 | Johnson |
| 3,130,927 A | 4/1964 | Schmieding |
| 3,136,491 A | 6/1964 | Posmanter |
| 3,633,834 A | 1/1972 | Nissen |
| 3,827,641 A | 8/1974 | Andersson |
| 3,991,947 A | 11/1976 | Schlessel |
| 4,026,490 A | 5/1977 | Johansson |
| 4,135,672 A | 1/1979 | Schlesser |
| 4,139,161 A | 2/1979 | Hupperich |
| 4,304,363 A | 12/1981 | Atkielski |

*Primary Examiner* — Faye Francis
(74) *Attorney, Agent, or Firm* — Albert O. Cota

(57) ABSTRACT

A portable leaf grinding device (PLGD 10) that is used to grind a substance such as a plurality of compacted leaves into a multiplicity of leaf particles. The PLGD (10) consists of a circular cap (12), a cone-shaped hollow structure (84) that is releaseably attached to the cap (12), and a container (102) that is also attached to the cap (12). The circular cap (12) has attached an upper grinding disk (42) having a plurality of downward-extending leaf grinding blades (58). The upper grinding disk (42) interacts with a lower grinding disk (62) which is attached to the structure (84) and which also includes a plurality of upward-extending grinding blades (72) and a plurality of bores (74). When the circular cap (12) is rotated, the blades on the two grinding disks (46,62) interact with each other to produce the multiplicity leaf particles. The leaf particles can be either stored in the container (102) for later use or used immediately as they exit from the structure (84).

20 Claims, 3 Drawing Sheets

PORTABLE LEAF GRINDING DEVICE

TECHNICAL FIELD

The invention generally pertains to leaf grinding devices, and more particularly to a hand-held, portable leaf grinding device that grinds a quantity of larger leaves into a multiplicity of leaf particles.

BACKGROUND ART

There are many types of leafy plants that can be ingested by humans. Many of these plants are eaten as seasonings for other foods, or in the case of tobacco, are ingested by smoking. Typically, when a leaf is utilized as a seasoning or is smoked, the leaf must first be dried and then ground to small sized particles.

There are many methods of grinding a dried leaf. Before the advent of mechanical devices a dried leaf was simply crushed in a person's hand. Though partially effective, the hand method was time consuming, unclean and was unable to provide consistency in the size of the ground leaf particles.

Mechanical devices, both powered and not powered, are effective for grinding a dried leaf. Unfortunately, most mechanical devices are dimensioned for use in a kitchen or other stationary environment. In order to use a mechanical grinding device, the dried leaves must be brought to where the device is located. For many applications this approach is impractical. For example, many smokers prefer to use fresh, recently-ground tobacco in their pipes or rolled into cigarettes.

Obviously, what is needed is a relatively small device, such as hand-held/pocket-sized, dried leaf grinder that can provide well-ground, consistency-sized leaf particles. A significant benefit would be to include a means of storing the ground particles in a container that is integral with the leaf grinding mechanism. In this manner, a person could grind dried leaves at anytime and any place, and then store and carry a quantity of the recently ground leaves for future use.

A search of the prior art did not disclose literature or patents that read directly on the claims of the instant invention. However, the following U.S. patents are considered related.

| U.S. Pat. No. | INVENTOR | ISSUED |
| --- | --- | --- |
| 4,139,161 | Hupperich | 13 Feb. 1979 |
| 4,135,672 | Schlesser | 23 Jan. 1979 |
| 4,026,490 | Johansson | 31 May 1977 |

The U.S. Pat. No. 4,139,161 patent discloses a two-piece container and grinder combination. The container has an upward-projecting cylindrical post having outward-extending grinding teeth. The cap is adapted to fit rotatably to the container and has two sets of teeth which cooperate with the teeth on the cylindrical post to grind the ingredients from the container as the ingredients pass from the container between the teeth.

The U.S. Pat. No. 4,135,672 patent discloses a grinding mill for coffee beans and the like including a receiver for the articles to be ground. The mill has at least one passageway for gravitationally passing the articles, a rotative discharge member beneath the receiver for discharging the ground material, and grinding means for communicating between the passageway and the discharge member.

The U.S. Pat. No. 4,026,490 patent discloses a spice or pepper mill having a portion adapted to fit the opening of a commercial spice jar. The spice is kept in the jar and is dispensed by holding the jar upside down and rotating the housing relatively thereto.

For background purposes and as indicative of the art to which the invention relates, reference may be made to the following remaining patents found in the search:

| U.S. Pat. No. | INVENTOR | ISSUED |
| --- | --- | --- |
| 197,982 | Seifert, et al | 11 Dec. 1877 |
| 210,837 | Chalas | 17 Dec. 1878 |
| 2,479,151 | Bostick | 16 Aug. 1949 |
| 2,688,448 | Lenz | 7 Sep. 1954 |
| 2,763,440 | Johnson | 18 Sep. 1956 |
| 3,130,927 | Schmieding | 28 Apr. 1964 |
| 3,136,491 | Posmanter | 9 Jun. 1964 |
| 3,633,834 | Nissen | 11 Jan. 1972 |
| 3,827,641 | Andersson | 6 Aug. 1974 |
| 3,991,947 | Schlessel | 16 Nov. 1976 |
| 4,304,363 | Atkielski | 8 Dec. 1981 |

DISCLOSURE OF THE INVENTION

The portable leaf grinding device (PLGD) is designed to manually grind a quantity of a material such as a leaf into a multiplicity of leaf particles. The leaf particles can be immediately used or stored in a container for later use. In its basic design configuration the PLGD is comprised of:

A. A circular cap having an upper surface, a lower container inserting cavity and a first disk insertion cavity, B. An upper grinding disk having an upper surface that is attached to the first disk insertion cavity, and a lower surface from where extends a multiplicity of grinding blades, C. A lower grinding disk having a lower surface and an upper surface having a plurality of bores that are interposed between a multiplicity of grinding blades, D. A cone-shaped hollow structure having a lower opening and an upper opening that is inserted over and attached to the lower grinding disk by an attachment means, E. Means for releasably attaching the cone-shaped hollow structure, with the lower grinding disk attached, to the circular cap, and F. A container having an upper opening that is attached to the container insertion cavity located on said circular cap, wherein the container has means for being rotatably attached to the circular cap. When a plurality of compacted leaves are placed between the upper and lower grinding disks and the circular cap is repeatedly rotated back and forth, the grinding blades grind the leaves into a multiplicity of leaf particles. The leaf particles are dimensioned to pass through the plurality of bores and into the container where the leaf particles can be removed and immediately used or stored for later use.

The upper grinding disk further comprises a side wall that surrounds a first diameter and an upper surface that is attached to the first disk insertion cavity. The lower grinding disk further comprises a side wall that is dimensioned to fit into the side wall encompassing the first diameter on the upper grinding disk and to interface with the lower surface of the upper grinding disk. Thus, the two disk function in combination to produce the leaf particles.

In view of the above disclosure, the primary object of the invention is to produce a PLGD that is used to grind a quantity of larger compacted leaves into a multiplicity of smaller leaf particles.

In addition to the primary object of the invention, it is also an object of the invention to produce a PLGD that:
  is easily operated,
  requires no maintenance other than an occasional cleaning of the blades and/or the container,
  can be made in various sizes,
  can grind various types of leaves,
  can be color coded to identify the leaves that have been ground,
  is easily transported, and
  is cost effective for both a manufacturer's and consumer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
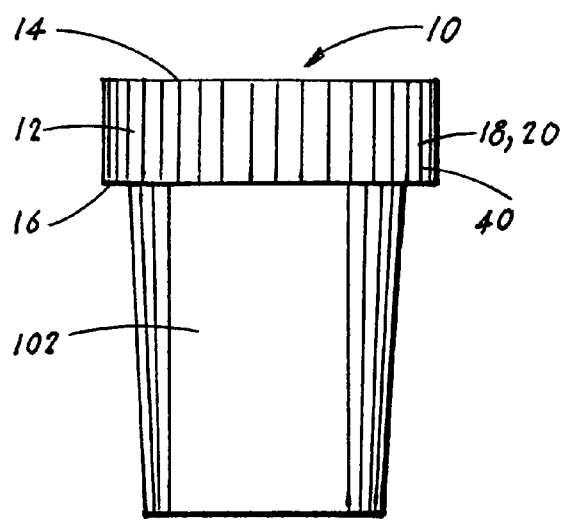
FIG. 1 is a front elevational view of an assembled portable leaf grinding device (PLGD).

The best mode for carrying out the invention is presented in terms that disclose a preferred embodiment of a portable leaf grinding device (PLGD). The preferred embodiment of the PLGD 10, as shown in FIGS. 1-9, is comprised of six major elements: a circular cap 12, an upper grinding disk 46, a lower grinding disk 62, a cone-shaped hollow structure 84 and a container 102. An assembled PLGD 10 is shown in FIG. 1, and an exploded view of the PLGD 10 is shown in FIG. 9.

Figure 2:
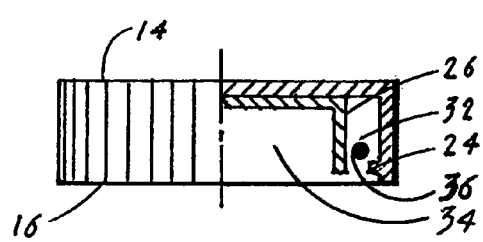
FIG. 2 is a partial elevational side view and cross-sectional view of the circular cap.
Figure 3:
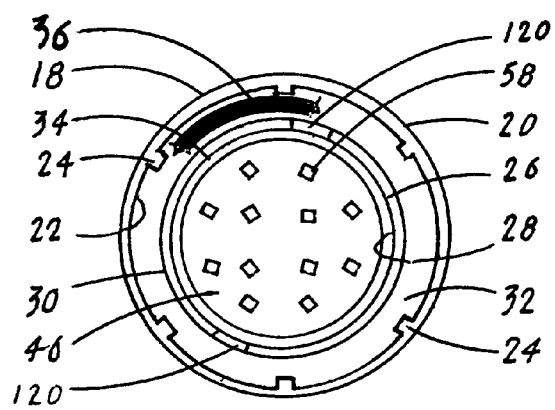
FIG. 3 is a bottom plan view of the circular cap showing a partial section of an o-ring.

The circular cap 12, as shown in FIGS. 1, 2 and 3, has an upper surface 14, a lower opening 16, an outer side wall 18 having an outer surface 20 and an inner surface 22 from where extends inward a plurality of container locking stubs 24. The container 12 also has a concentric inner side wall 26 that has an inner surface 28 and an outer surface 30. The outer surface 30 is separated from the inner surface 22 of the outer side wall 18 to form a container inserting cavity 32. To hermetically seal the circular cap 12 to the container 102, an o-ring 36 is placed within the container inserting cavity 32, as shown partially in FIGS. 2 and 3. The area surrounding the inner surface 28 of the inner side wall 26 forms a first disk insertion cavity 34, as also shown in FIGS. 2 and 3. The container 12 can also be produced to include a multiplicity of vertical gripping serrations 40, as shown in FIG. 1, and indicia 42, as shown in FIG. 9.

Figure 4:
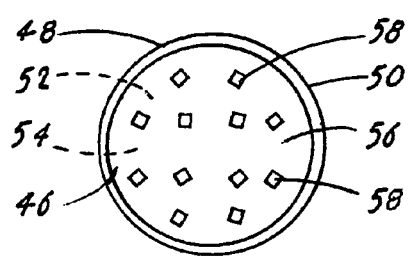
FIG. 4 is a bottom plan view of the upper grinding disk.

The upper grinding disk 46, which is shown attached to the circular cap 12, in FIG. 3, and removed from the cap 12 in FIG. 4, is comprised of a side wall 48, an upper surface 52 and a lower surface 56. The side wall 48 surrounds a first diameter 50 and the upper surface 52 includes means 54 for being attached to the first disk insertion cavity 34, as shown in FIG. 3. The attachment means 54 can consist of a friction fit 78 or an adhesive 80 can be utilized. From the lower surface 56 extends a multiplicity of grinding blades 58. In the preferred embodiment, twelve grinding blades 58 are utilized with each blade 58 having four sharpened edges 76. Both the upper grinding disk 46 and the grinding blades 58 are made of steel to assure that the blades 58 retain a sharp grinding edge.

Figure 5:
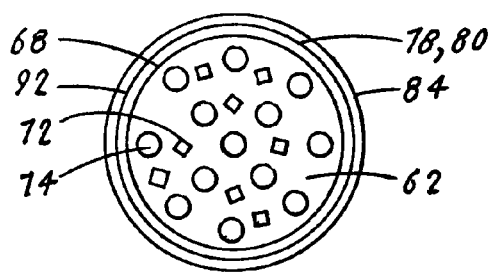
FIG. 5 is a top plan view of the cone-shaped hollow structure with the lower grinding disk attached.
Figure 6:
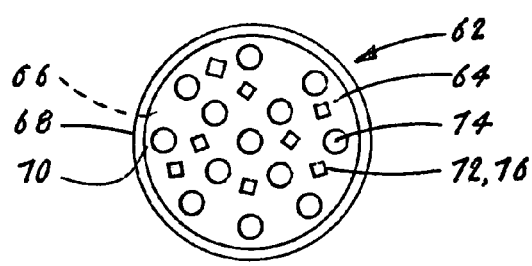
FIG. 6 is an upper plan view of the lower grinding disk.

The lower grinding disk 62, which is shown attached to the cone-shaped hollow structure 84 in FIG. 5, and removed from the structure 84 in FIG. 6, is comprised of an upper surface 64, a lower surface 66 and a side wall 68. The side wall 68 surrounds a second diameter 70 that is dimensioned to fit into the side wall 48 encompassing the first diameter 50 on the upper grinding disk 46 and to interface with the lower surface 56 of the upper grinding disk 46. From the upper surface 64 of the lower grinding disk 62 extends a multiplicity of grinding blades 72 that preferably consist of eight blades with each blade 72 having four sharpened edges 76. Interposed between the eight grinding blades 72 are a plurality of bores 74, as shown best in FIG. 5. Both the disk 62 and the blades 72 are made of steel.

Figure 7:
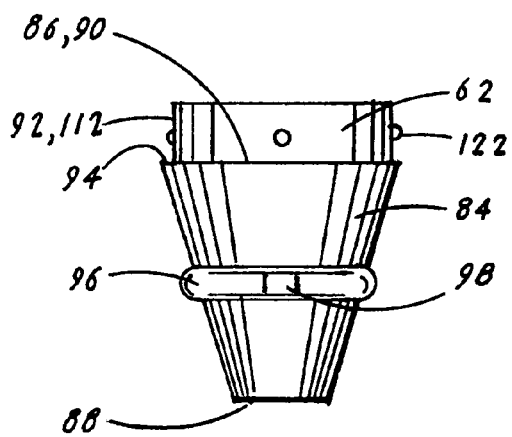
FIG. 7 is a side elevational view of an assembled cone-shaped hollow structure.

The cone-shaped hollow structure 84, which is shown in FIG. 7, has an upper opening 86, a lower opening 88 and is preferably made of plastic. The upper opening 86 has a diameter 90 that is dimensioned to be inserted over the side wall 68 of the lower grinding disk 62 and to be attached thereto by an attachment means 92. The preferred attachment means 92 consists of the lower grinding disk 62 designed to have a serrated surface 112, as shown in FIG. 7. The upper opening 86 of the cone-shaped hollow structure 84 is then friction-fitted over the serrated surface 112.

The cone-shaped hollow structure 84 is further comprised of at least one horizontal protrusion 96 that is substantially centered and that extends around the circumference of the structure. The protrusion 96, which allows a person to easily grasp the structure 84, can be further comprised of a set of spaced finger indentations 98 that further aid in grasping the structure 84.

The PLGD 10 also includes means 94 for releasably attaching the cone-shaped hollow structure 84, with the lower grinding disk 62 attached to the concentric inner wall 26 located on the circular cap 12. The attachment releasing means 94 can vary however, the preferred attachment means consists of a plurality of L-shaped entry and locking slots 120 that extend along the concentric inner side wall 26 located on the circular cap 12. The locking slots 120 function in combination with a plurality of locking studs 122 that extend along the side wall of the lower grinding disk 62 and that are dimensioned to be inserted into a respective L-shaped entry and locking slot 120.

Figure 8:
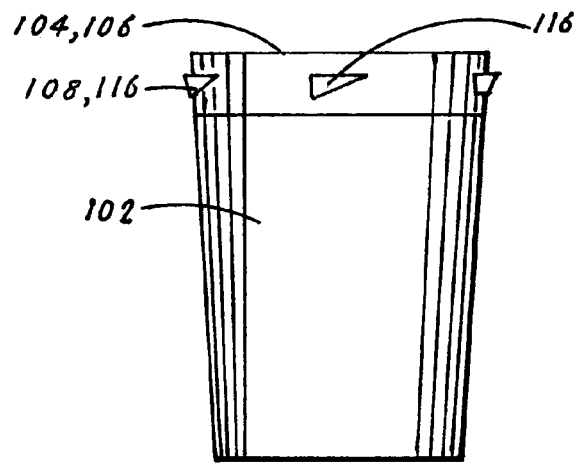
FIG. 8 is a side elevational view of the container.
Figure 9:
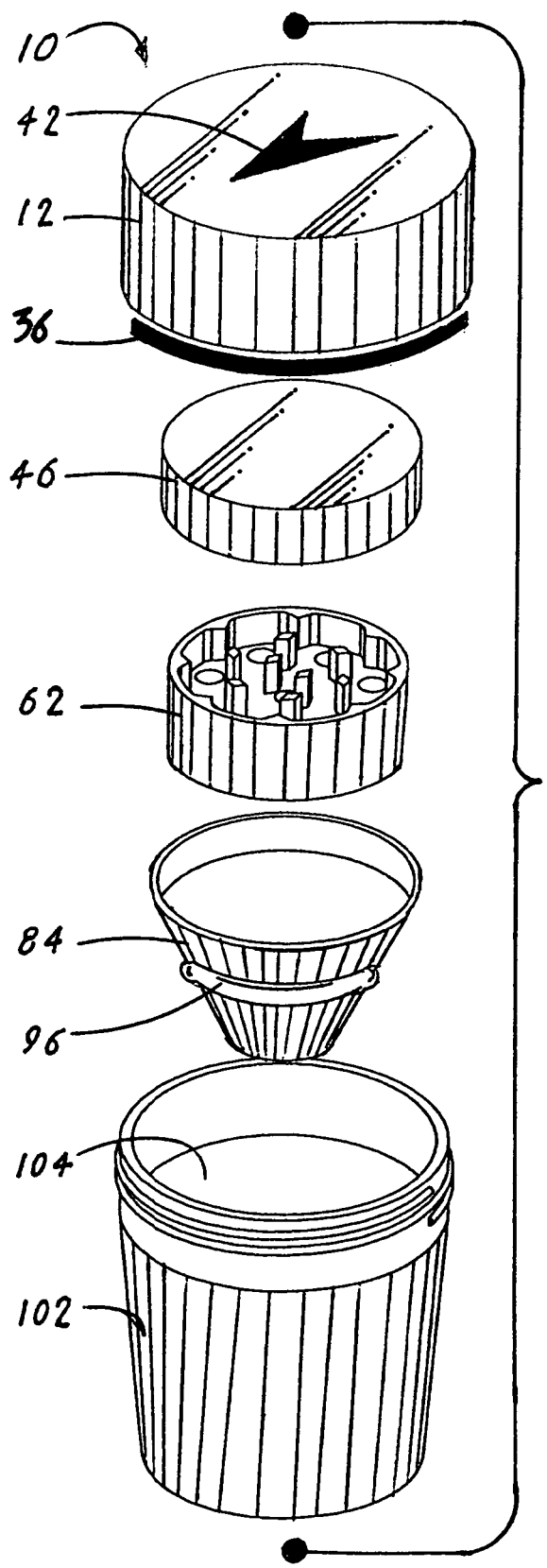
FIG. 9 is an exploded view of the PLGD.

The final element that comprises the PLGD 10 is the container 102 which is shown in FIGS. 1, 8 and 9. The container 102 has an upper opening 104 having a diameter 106 that is dimensioned to be inserted into the container inserting cavity 32 located on the circular cap 12. The container 102 also has means 108 for being releasably attached to the plurality of locking stubs 24 that are located on the circular cap 12. The preferred means for releasably attaching the container 102 to the circular cap 12 comprises a plurality of downward-angled protrusions 116. The protrusions 116 are spaced apart to allow the circular cap 12 to be rotated prior to a protrusion 116 engaging a respective locking stub 24 located on the circular cap 12.

To operate the PLGD 10 a plurality of compacted leaves are placed between the upper and lower grinding disks 46,62 and the circular cap 12 is repeatedly rotated in a clockwise and in an counter-clockwise direction. The grinding disks separate the compacted leaves into a multiplicity of leaf particles that are sized to easily pass through the plurality of bores 74 and into the container 102 where the leaf particles can be removed and immediately used or stored for later use.

The circular cap 12, the cone-shaped hollow structure 84 and the container 102 are made of a material that is selected from the group consisting of plastic, glass, metal and wood.

Alternatively, an assembly consisting of the circular cap 12 with the upper grinding disk 46 attached, and the cone-shaped hollow structure 84 with the lower grinding disk 62 attached, can be used to direct the leaf particles through the lower opening 88 on the structure 84 and onto a selectable article.

While the invention has been described in detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

The invention claimed is:

1. A portable leaf grinding device comprising:
   a) a circular cap having an upper surface, a lower container inserting cavity and a first disk insertion cavity,
   b) an upper grinding disk having an upper surface that is attached to the first disk insertion cavity, and a lower surface from where extends a multiplicity of grinding blades,
   c) a lower grinding disk having a lower surface and an upper surface having a plurality of bores that are interposed between a multiplicity of grinding blades,
   d) a cone-shaped hollow structure having a lower opening and an upper opening that is inserted over and attached to said lower grinding disk by an attachment means,
   e) means for releasably attaching said cone-shaped hollow structure, with said lower grinding disk attached, to said circular cap, and
   f) a container having an upper opening that is attached to the container insertion cavity located on said circular cap, wherein said container having means for being rotatably attached to said circular cap, wherein when a plurality of compacted leaves are placed between said upper and lower grinding disks and said circular cap is repeatedly rotated back and forth, said grinding blades separate the compacted leaves into a multiplicity of leaf particles that are dimensioned to pass through the plurality of bores and into said container where the leaf particles can be removed and immediately used or stored for later use.

2. The portable leaf grinding device as specified in claim 1 further comprising an o-ring located within the container inserting cavity.

3. The portable leaf grinding device as specified in claim 1 wherein said upper and lower grinding disks and their respective grinding blades are made of steel.

4. The portable leaf grinding device as specified in claim 3 wherein the grinding blades each have four sharpened edges.

5. The portable leaf grinding device as specified in claim 1 wherein said upper grinding disk further comprises a side wall that surrounds a first diameter and an upper surface that is attached to the first disk insertion cavity by means of an adhesive.

6. The portable leaf grinding device as specified in claim 5 wherein said lower grinding disk further comprises a side wall that is dimensioned to fit into the side wall encompassing the first diameter on said upper grinding disk and to interface with the lower surface of the upper grinding disk.

7. The portable leaf grinding device as specified in claim 1 wherein said cone shaped hollow structure further comprises at least one horizontal protrusion that is substantially centered and that extends around the circumference of said cone shaped structure and further having a set of spaced finger indentations, wherein said protrusion allows a person to easily grasp the structure.

8. The portable leaf grinding device as specified in claim 1 wherein said circular cap, said cone-shaped hollow structure are made of a material selected from the group consisting of plastic, glass, metal and wood.

9. A portable leaf grinding device comprising:
   a) a circular cap having an upper surface, a lower opening, an outer side wall having an outer surface and an inner surface from where extends inward a plurality of container locking stubs, a concentric inner side wall having an inner surface and an outer surface that is separated from the inner surface of the outer side wall to form a container inserting cavity, wherein the area surrounding the inner surface of the inner side wall forms a first disk insertion cavity,
   b) an o-ring located within the container inserting cavity,
   c) an upper grinding disk having a side wall that surrounds a first diameter, an upper surface having means for being inserted into and attached to the first disk insertion cavity, and a lower surface from where extends a multiplicity of grinding blades,
   d) a lower grinding disk having an upper surface, a lower surface, a side wall that surrounds a second diameter that is dimensioned to fit into the side wall encompassing the first diameter on said upper grinding disk and to interface with the lower surface of the upper grinding disk, wherein from the upper surface of said lower grinding disk extends a multiplicity of grinding blades and a plurality of bores that are interposed between the multiplicity of grinding blades,
   e) a cone-shaped hollow structure having an upper opening and a lower opening, wherein the upper opening has a diameter that is dimensioned to be inserted over the side wall of said lower grinding disk and to be attached thereto by an attachment means,
   f) means for releasably attaching said cone-shaped hollow structure, with said lower grinding disk attached, to the concentric inner side wall located on said circular cap, and
   g) a container having an upper opening with a diameter that is dimensioned to be inserted into the container inserting cavity located on said circular cap, wherein said container having means for being releasably attached to the plurality of locking stubs located on said circular cap, wherein when a plurality of compacted leaves are placed between said upper and lower grinding disks and said circular cap is repeatedly rotated, said grinding disks separate the compacted leaves into a multiplicity of leaf particles that are dimensioned to pass through the plurality of bores and into said container where the leaf particles can be removed and immediately used or stored for later use.

10. The portable leaf grinding device as specified in claim 9 wherein the outer surface of said circular cap further comprises a multiplicity of vertical gripping serrations.

11. The portable leaf grinding device as specified in claim 10 wherein the upper surface of said circular cap further comprises indicia.

12. The portable leaf grinding device as specified in claim 9 wherein said upper and lower grinding disks and their respective grinding blades are made of steel.

13. The portable leaf grinding device as specified in claim 12 wherein the grinding blades each have four sharpened edges.

14. The portable leaf grinding device as specified in claim 9 wherein said means for attaching the upper grinding disk to the first disk insertion cavity located on said circular cap comprises a friction-fit.

15. The portable leaf grinding device as specified in claim 9 wherein said means for attaching the upper grinding disk to the first disk attachment cavity located on said circular cap comprises an adhesive.

16. The portable leaf grinding device as specified in claim 9 wherein said cone shaped hollow structure further comprises at least one horizontal protrusion that is substantially centered and that extends around the circumference of said structure, wherein said at least one protrusion allows a person to easily grasp the structure.

17. The portable leaf grinding device as specified in claim 16 wherein said at least one protrusion further comprises a set of spaced finger indentations that further aid in grasping the structure.

18. The portable leaf grinding device as specified in claim 9 wherein said means for attaching the upper opening of said cone-shaped hollow structure to the side wall of said lower grinding disk comprises:
   a) said lower grinding disk having side walls having a serrated surface, and
   b) the upper opening of said cone-shaped hollow structure is friction-fitted over the serrated surface.

19. The portable leaf grinding device as specified in claim 9 wherein said means for releasably attaching said container to said circular cap comprises a plurality of downward-angled protrusions that are spaced apart to allow the circular cap to be rotated prior to a protrusion engaging a respective locking stud located on said circular cap.

20. The portable leaf grinding device as specified in claim 9 wherein said means for releasably attaching the cone-shaped hollow structure, with said lower grinding disk attached, to the concentric inner side wall located on said circular cap comprises:
   a) a plurality of L-shaped entry and locking slots that extend along the concentric inner side wall located on said circular cap, and
   b) a plurality of locking studs that extend along the side wall of said lower grinding disk, wherein the studs are dimensioned to be inserted into a respective L-shaped entry and locking slot.

* * * * *